United States Patent [19]

Whetstone et al.

[11] 3,821,469

[45] June 28, 1974

[54] GRAPHICAL DATA DEVICE

[75] Inventors: Albert L. Whetstone, Southport, Conn.; Samuel Fine, New City, N.Y.; Robert Davis, Prospect, Conn.

[73] Assignee: Amperex Electronic Corporation, Hicksville, Long Island, N.Y.

[22] Filed: May 15, 1972

[21] Appl. No.: 253,417

[52] U.S. Cl. ............... 178/18, 181/.5 NP, 340/16 R

[51] Int. Cl. ...... G01s 3/80, G01s 5/16, G08c 21/00

[58] Field of Search ....... 178/18, 17, 20; 179/111 E; 340/365, 16 R; 181/.5 NP, .5 AP

[56] References Cited

UNITED STATES PATENTS

| | | | |
|---|---|---|---|
| 3,156,766 | 11/1964 | Stamps | 178/18 |
| 3,176,263 | 3/1965 | Douglas | 178/19 |
| 3,504,334 | 3/1970 | Turnage | 178/18 |
| 3,626,483 | 12/1971 | Whetstone | 181/.5 NP |
| 3,711,852 | 1/1973 | Firnig | 178/17 |
| 3,731,273 | 5/1973 | Hunt | 340/16 R |

OTHER PUBLICATIONS

"The Foil Electric Microphone," West & Sessler, Bell Laboratories Record, Vol. 47, No. 7, pp. 245–24, Aug. 1969.

*Primary Examiner*—Thomas A. Robinson

[57] ABSTRACT

A graphical data device employing a stylus moving through a cubic space to be digitized and utilizing a fast rise time sound energy shock wave, generated by a spark at the location of the stylus and propagated through the air for providing three dimensional coordinate information as to the instantaneous position of the spark. Receiver devices are positioned along X, Y and Z coordinates and respond to the leading edge of the air propagated shock wave front to provide an elapsed time indication from the moment of spark generation to the moment of shock wave reception.

3 Claims, 11 Drawing Figures

GRAPHICAL DATA DEVICE

This invention relates to a graphical data device and more particularly to a mechanism for digitizing the position of a stylus with respect to a fixed set of three dimensional reference coordinates.

Graphical data devices are commonly employed in such areas as facsimile transmission and in computer data input devices. The earlier forms of such devices employed a stylus in the form of a writing pen or pointer mechanically coupled to a set of arms for translating the movement of the stylus into a sequence of usable information signals. Such arrangements are unsatisfactory in that they present undesirable frictional and inertial limitations. The use of induction pick up devices has also been attempted, but with difficulty due to noise generated by stray fields and other undesired interference. Sheet resistance material has been employed to provide an X/Y coordinate indication but has presented resolution and uniformity problems giving rise to erroneous information. Other attempts include designing a tablet in the form of a laminated matrix of X and Y conductors, the movement of the stylus thereon providing a continuous coordinate reading of stylus position. Such systems are extremely uneconomical in view of the expense of the tablet construction and in view of the extensive electronics necessary to interpret the coordinate information provided, and do not operate over a three dimensional area. Light pen systems require interaction with cathode ray tube display screens and are limited in usefulness, and also do not react well in three dimensional space configurations. Attempts at employing sonic transducer coordinate devices result in requiring some form of acoustic transmission plate in contact with a vibrating stylus and is functionally limited in that the stylus must make direct contact with the acoustic transmission medium (usually a glass plate) without the intervention of a damping medium such as a sheet of paper. Again, a three dimensional configuration is not possible at all in such a framework.

In the system of the present invention, the graphical data device is multi dimensional, containing three coordinate reference positions, and defining a cubic data space within the defining coordinates. The device operates by employing atmospheric transmissible signals corresponding to the position of the stylus with respect to the dimensional reference points. The advantage of an atmospherically transmissible signal is significant in that it relieves the graphical device from the problems of non-uniformities in a transmitting surface and that in enables three dimensional digitizing, whereas the prior systems are all of necessity limited to the two dimensional surface area. In the preferred embodiment, the transmitted signal is a fast rise time sound pulse which is generated by a low energy discharge in the form of a spark generated at or near the tip of the stylus. The use of the spark as the signal generating medium is specifically advantageous as will be more apparent in the later following detailed description. The receiver units are microphones, preferably capacitive, mounted at suitable positions corresponding to the desired dimensional references. The spark may be periodically generated at various rates. Each microphone is coupled to a data digitizer which senses the time duration between each spark generation and reception at a respective microphone, and provides a data signal representative of such duration. The duration is a measure of the various elapsed times taken by the sound shock wave along the respective coordinate axes to an appropriate receiver and thereby an effective indication of the position of the stylus with respect to the reference dimensions.

The microphone is in preferred form a capacitive microphone having a substantially uniform response characteristic. The sparks are triggered by a capacitive discharge circuit employing a series of capacitors to build up a potential energy level sufficient to create the desired spark.

In the three dimensional form of the invention, each microphone is arranged along an appropriate axis and in the form of a cylinder encompassing the desired space. Each microphone is provided with a digitizing channel. In this manner a three dimensional object or pattern is digitized.

The data of the graphic device can be fed to a computer memory for temporary or permanent storage and retrieval when desired. By storing, and later retrieving, the image can be recalled for display on a suitable cathode ray tube device. The data can also be fed directly to a display device by conversion of the digitized signals to analog magnitudes and displayed as a continuous series of signals on the face of a cathode ray tube display.

It is therefore an object of the present invention to provide an improved three dimensional graphical data device.

It is another object of this invention to provide a three dimensional graphical data device employing atmospherically transmissible signals.

It is a still further object of the invention to provide a three dimensional graphical data device employing an atmospherically transmissible fast rise time sound pulse created by a low energy electrical discharge in the form of a spark at or near the tip of the stylus.

It is a still further object of the invention to provide a three dimensional graphical data device having high accuracy, reliability and with a degree of economy heretofore unattainable.

The foregoing objects and brief description as well as further objects and features of the invention will become more apparent from the following specification and the appended drawings, wherein:

FIG. 1 is a block diagram generally illustrative of the invention;

FIG. 1A a detail of the cylindrical microphone of FIG. 1;

Figure 1:
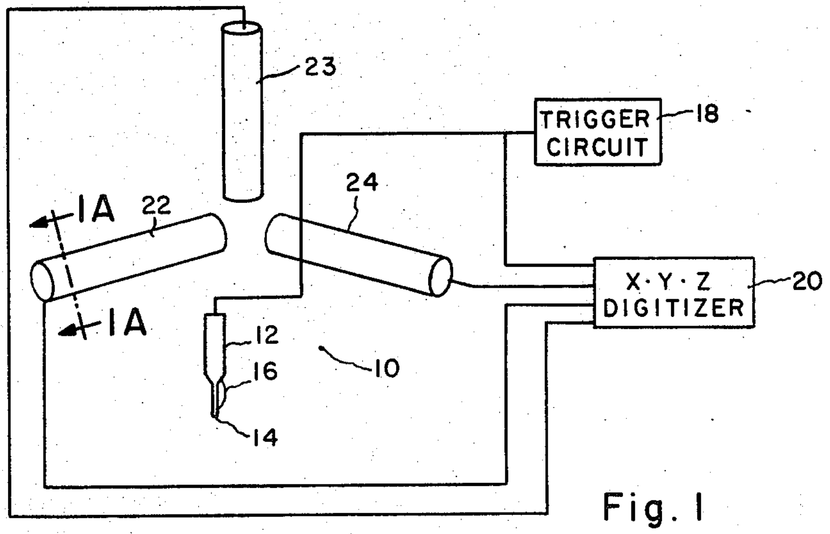

Referring to FIG. 1, the space 10 is shown as a definable bounded cubic volume for ease of illustration. The space 10 is supportive only and performs no actual function within the operation of the graphical data device of this invention. As a practical matter, the space 10 can have rather large dimensions, on the order of several tens of cubic feet. A stylus 12 is movable through the space 10 over a volume to be digitized and is preferably cartridge in form. A typical stylus which may be employed is described in U.S. Pat. No. 3,626,483 and assigned to the assignee of the present invention. The stylus 12 can be provided with a writing tip 14 which may for example be a conventional ball-point pen cartridge, and includes an electrode set 16 having a gap for producing a suitable electrical discharge in the form of a spark. The spark itself is constituted by a sudden discontinous discharge of electricity, as through air, and thereby producing a fast rise time sound pulse or wave radiating away from the point of discharge. The spark electrodes may be conventional electrical conductors separated by a gap of sufficient spacing to produce a spark when suitably triggered by a voltage of sufficient magnitude, as will be described in further detail below.

The stylus spark is triggered by means of a trigger circuit 18, which latter also provides a trigger timing pulse to the X, Y, Z digitizer. The shock wave created by the spark at the tip 16 of the stylus 12 will propagate through the atmosphere until contacting the microphones 22, 23 and 24. Since the propagation through air of the sound wave front created by the spark will reach the respective microphones at the closest perpendicular distance from the sound source, the time duration of transit will be a measure of position of the stylus with respect to the microphones. Each microphone is coextensive with the operative space 10 and defines its dimensions. The elapsed time duration is digitized in the digitizer 20 which begins digitization in accordance with the initial trigger pulse and ends digitization, on a coordinate or channel by channel basis, upon receipt of the leading edge of a wave front at the microphones 22, 23, or 24. The spark signal may be a single spark for a single point digitization or a controlled rate of repetitive sparks for a series of coordinate digitizations. The latter is effective for storing surface images and the like which are definable as a series of points. By increasing the spark repetition rate, extremely high resolution can be obtained.

The stylus may be provided with a manually operative switch or a writing pressure switch. For the present invention the manually operative switch is used in all instances except where points to be digitized are on the surface defining the bottom of the three dimensional data space. The operation of this switch can serve several alternative functions. In a first function, the switch can couple single pulses to the electrode for each switch activation. In this function, only a single digitization point will be produced for each point of contact between stylus and surface or each manual activation. In an alternative switching mode, the switch can provide continuous digitization of the stylus position while permitting readout of digitization only when the stylus is in contact with the data surface or when there is a manual activation. The former mode is particularly advantageous where straight line or pre-programmed images are made, as the stylus will digitize end points and a storage readout device can provide a connecting line. The latter mode is particularly useful in the digitization of drawings or graphic designs, particularly in adaptive or self corrective types of displays. The position of the stylus is continually digitized whether on or off the data surface. Utilizing this feature, a storage screen or display may continually display the position of the stylus without permanently storing same so that the operator can precisely locate pre-stored positions on the screen without the necessity of continually probing the data surface. This feature is particularly valuable because the data surface need not be maintained in a precise position at all times since the stylus position is always ascertainable above the surface as well as on it. Similarly, by moving the stylus beyond the receiving range of the microphones, an overload condition is created which can be utilized to indicate an end of transmission.

Figure 1A:
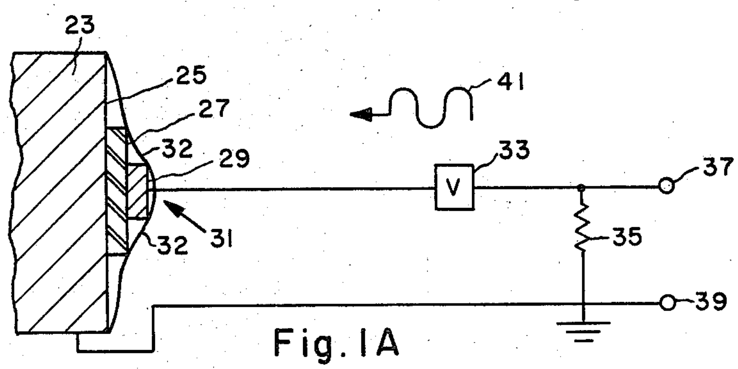

The microphone units may be any form of acoustic transducers constructed so as to produce a substantially uniform magnitude output pulse in response to the incidence at any point along the microphone length of a sound shock wave front. A preferred form of microphone structure is indicated at FIG. 1A, showing a cross-sectional view of a microphone used in FIG. 1 and as shown therein is constructed of a bar length of any type of metallic base structure 23 such as aluminum. A layer of insulating polyester film 27 such as Mylar is mounted to the surface 25. A metal layer 29 such as copper is mounted to the insulating film 27. A final layer of a polyester film 31 such as Mylar, metallized on the external surface, is affixed to the base structure 23 and encloses the conductor insulator sandwich. A high voltage source of, for example, 500 volts is coupled to layer 29, and through a limiting resistance 35 to the base portion 23 and the metallized film 31. The output is taken across the resistance 35 via terminals 37 and 39. In operation, a sound wave 41 approaching the surface of the metallized film 31 causes movement of the film 31 relative to the metal layer 29 particularly within the sensitive region 32. Since the capacitive effect is directly dependent upon the spacing between layers 29 and 31, the movement will have the effect of varying the capacitance and therefore the output across terminals 37 and 39. If the microphone is operated at constant Q, then in accordance with the standard relationship for a capacitor:

$$Q = CV$$

$$V = Q/C,$$

and assuming $Q$ constant, $$dv = Q\, dc/C^2$$

$$dv/v = dc/c$$

the output voltage will be a direct function of the capacitance change.

Figure 2:
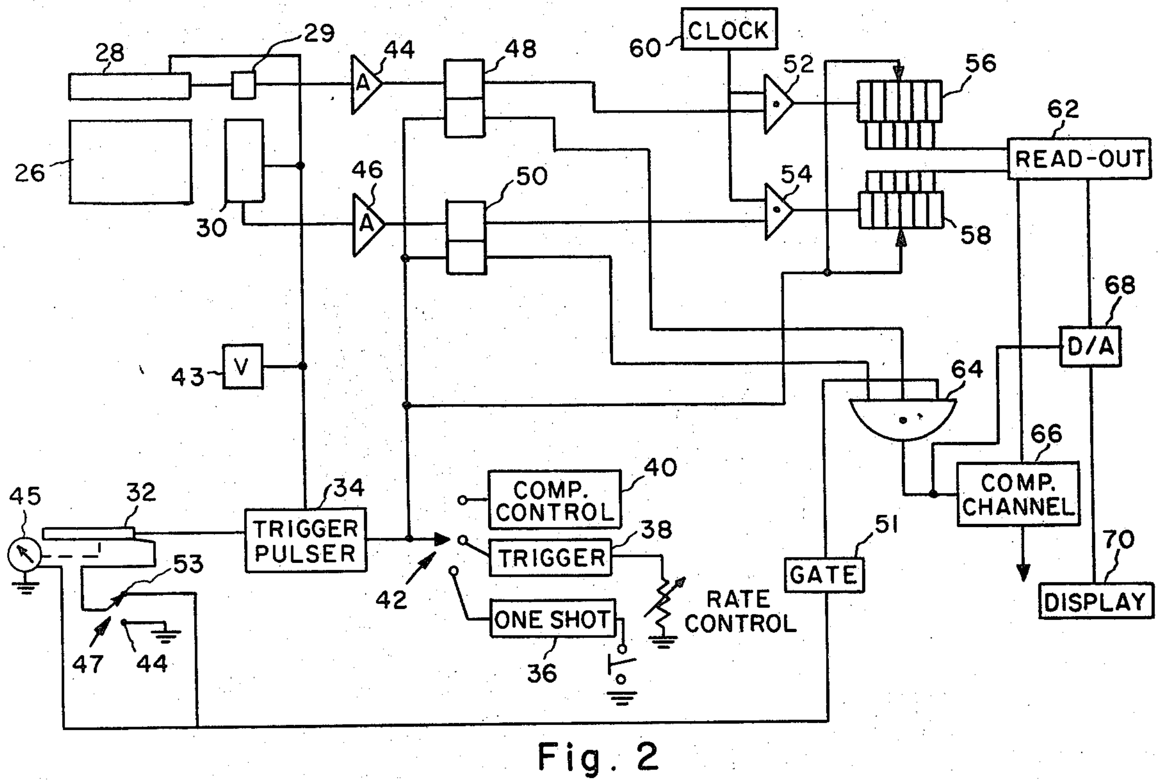
FIG. 2 is a more detailed schematic illustrating operation of a multi dimensional graphical digitizer.

Referring now to FIG. 2, a three dimensional graphical data device is shown. The space above area 26 is bordered by X, Y and Z microphones 28, 29 and 30. The connections to Z microphone 29 are omitted for clarity, but are the same as shown for microphones 28 and 30. For purposes of convenience in describing the operation of the system, only operation of the circuitry coupled to microphones 28 and 30 (defining area 26) is detailed, but it will be understood that circuitry coupled to the vertical microphone 29 is the same as that coupled to the other microphones. The stylus 32 is triggered by a trigger pulser 34 which is any form of conventional trigger generator. Both microphones and trigger pulser are powered by a voltage source 43. For low energy level sparks the generator can store an energy level of, for example, $10^{-3}$ joules for subsequent discharge through the spark gap. The energy produced can be higher but the level thereof should be controlled by safety factors. The trigger pulses can be energized any number of ways, including a one-shot trigger 36 for producing single sparks and which may be manually controlled, a rate variable free running trigger oscillator 38 for producing a series of spark pulses, and a computer input 40 which enables spark generation to be controlled externally. The one-shot 36 and free running oscillator 38 may be of a conventional variety. The computer control terminal 40 can be from any externally applied means for generating trigger signals as desired. A mode selection switch 42 couples the desired input to the trigger pulser.

The X–Y microphones 28 and 30 are respectively coupled to high gain band pass amplifiers 44 and 46. Since the spark shock wave produces a fast rise time electrical impulse upon impinging on the microphone, the band pass amplifiers will allow only the fast rise time portion of the electrical pulse to pass while blocking out all noise signals outside the band. To insure rapid operation, the amplifiers include threshold discriminators which provide an output pulse with steep leading edges in response to the input thereto exceeding a predetermined level.

The outputs of the respective amplifiers 44 and 46 are coupled to the respective inputs of a conventional bistable flip-flop network 48 and 50. One output of each flip-flop is gated through gates 52 and 54 into X-channel and Y-channel counters or scalers 56 and 58. The gates 52 and 54 respectively receive a clock input from a clock pulse generator 60. The counter outputs are coupled to a readout unit 62 which may be any conventional form of interim storage device or transfer register.

Figure 3:
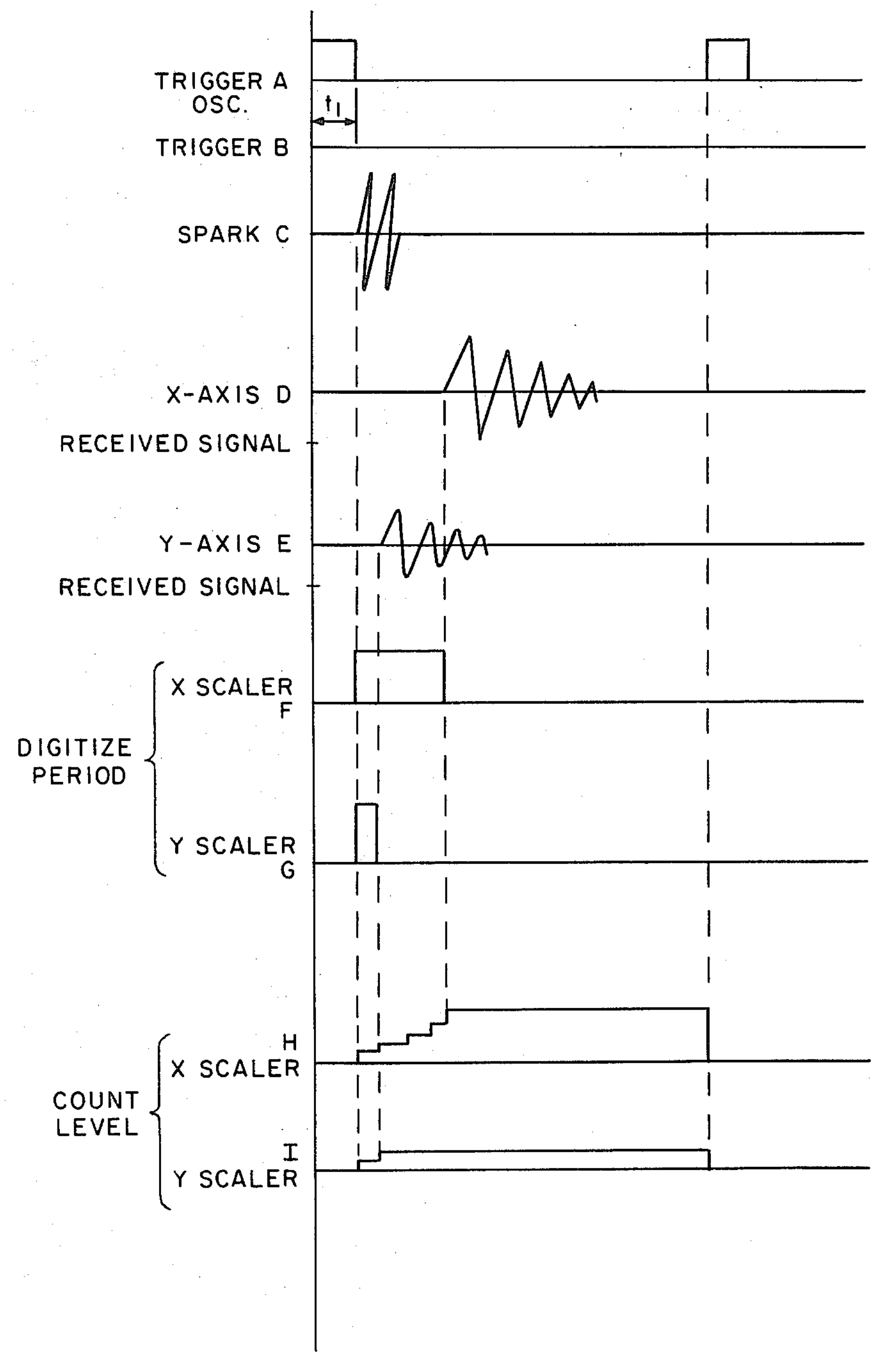
FIG. 3 illustrates the waveform relationships of the digitizer shown in FIG. 2.

The external source initiation of a trigger signal passing through the switch 42 (FIG. 3A) acts to trigger a pulse from pulser 34 (FIG. 3B) and initiate a spark (FIG. 3C). The trigger signal is also conducted simultaneously to each of the flip-flops 48 and 50 and acts to reset the scalers 56 and 58. The effect of the trigger signal on flip-flops 48 and 50 is to set each flip-flop in a state permitting the AND gates 52 and 54 coupled thereto to pass clock pulses from the clock source 60. The scalers each begin to accumulate a digital count (FIGS. 3F and 3G; FIGS. 3H and 3I). The count continues to accumulate until an appropriate signal is received at the microphone units 28 and 30 (FIGS. 3D and 3E). The leading edge of the respective coordinate signal received acts to reset the state of the appropriate flip-flop 48 or 50 and thereby block the AND gate 52 or 54 coupled thereto; holding the flow of clock pulses and ceasing the scaler accumulation. The period between trigger pulses is sufficient to allow the received signals to damp out. The scaler reset operation is effected on the leading edge of the trigger pulse (FIG. 3A) and the unblocking of the AND gates on the trailing edge. The trigger pulse has a duration of $t_1$ and thus results in creating a "dead space" or margin at a distance from each microphone of a distance equal to the ratio of the time $t_1$ to the velocity of sound in air. Thus, for example, if the reset pulse duration is 40 microseconds, and the time of traversal of sound in air over 1 inch is 75 microseconds, the effective margin area is approximately one-half inch.

The complementary outputs of flip-flops 48 and 50 are respectively coupled to an additional AND gate 68. This latter gate is coincidently energized only during the period after the count accumulation is complete but before the reset period when both flip-flops 48 and 50 are in the reset state. This provides the "data ready" indication which can be utilized for transferring the accumulated count to an appropriate output.

As shown, the gate 64 can energize a computer channel 66 which can receive the data from the readout unit 62, or a digital to analog conversion unit 68 which can convert the digitization to a series of analog voltages for display on a cathode ray screen 70. The latter can be a storage unit, thereby allowing continuous readout and permanent screen storage for observation.

A pressure switch 45 contained within the stylus 32 can be arranged so as to cause several varied operations. As noted above, the stylus may be provided with a manually operative switch or a writing pressure switch with the manually operative switch being used in all instances except where points to be digitized are on the surface 26 defining the bottom of the data space. For example, a mode switch is provided and sets the stylus spark electrodes for receiving trigger pulse, from pulser 34, in two modes. A first position 44 connects the pulses to the electrodes continuously. Thus, a continuous digitization of the spark is provided regardless of whether the stylus is on or off the data surface. Readout of digitization however does not occur until pressure switch 45 is activated, thereby allowing gate 64 to become unblocked by virtue of activation of a gate source 51. In the second mode, switch 47 is in position 53. In this position, both sparking and readout only occur when the pressure switch 45 is activated.

Figure 5:
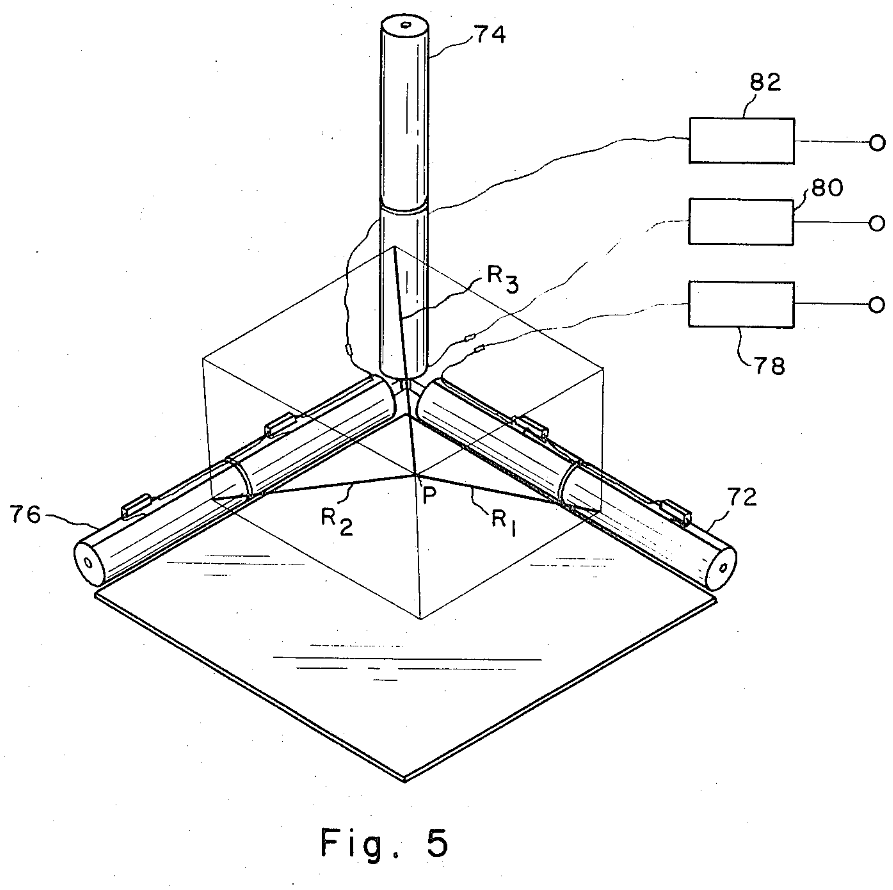
FIG. 5 is a diagram of a three dimensional multi section system.

Referring to FIG. 5, an embodiment is illustrated wherein the invention is employed for digitizing in three dimensions using a particular preferred microphone structure. Here, three microphones, 72, 74, 76 are positioned about a three dimensional space area. The microphones are constructed as cylinders with a surface area sufficient to encompass the desired dimension. A spark generated at any point within the confines of the operative area will result in a three point digitization of the elapsed time from spark generation to reception by each respective microphone 72, 74, 76 and its associated channel electronics 78, 80, 82. The channel 78, 80, 82 units may operate in precisely the manner described in connection with FIG. 2. Multi dimensional analysis employing more than three microphones can also be accomplished, as will be evident to those skilled in the art.

The use of cylindrical microphones has a distinct advantage over the use of flat microphones in a three dimensional sensing configuration in the scope of angular sweep, in that a cylindrical microphone permits an angular sweep of 90°.

Figure 4A:
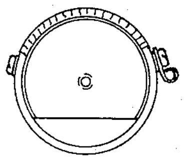
FIGS. 4 and 4A illustrate a microphone embodiment of the invention.
Figure 4:
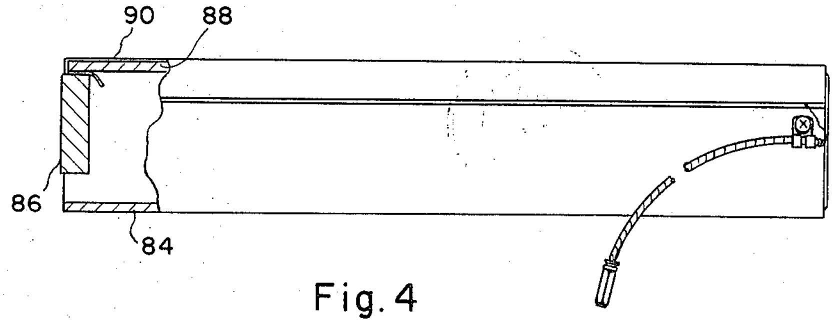

A satisfactory construction employable as a cylindrical microphone is shown in some detail in FIGS. 4 and 4A. The foil electret construction is preferable.

These microphones utilize a permanently polarized thin foil (typically ¼- to ½-mil Mylar foil) which has a metal layer on one side. The free charges (due to positive and negative ions or electrons) and the bound charges (due to a polarization) of such a foil electret induce charges in the metal layer of the foil and in the back plate. The number of these charges is dependent upon the distance between the foil and the back plate.

Since a sound wave which impinges on the foil will change this distance periodically, a voltage is generated between the two electrodes. Thus, the electret microphone converts mechanical energy directly into electrical energy without using an external bias.

While all electret charges (whether free or bound) are subject to decay due to finite relaxation times, these changes are relatively slow for good electrets, and relaxation times are of the order of years.

Electrets are usually formed in an electric field between two metal plates. The field creates a polarization in the dielectric, or the "heterocharge." At the same time, electrons are injected into or extracted from the foil by the metal plates, thus creating real or free charges, the "homocharge." The term "electret" is therefore used for a dielectric in which the heterocharge, the homocharge, or both charges are permanent.

A foil electret with one of its two surfaces covered by a metal layer obviously is not capable of carrying a permanent surface charge on this surface. Therefore, to ignore space charges as postulated above, an internal "surface" separated by a small distance from the metal layer is assumed. Thus, the foil electret is considered as consisting of two dielectric layers.

The prepolarization of the electret foil is typically accomplished by heating the foil to roughly 120°C and applying a high DC field. The foil is then allowed to cool slowly in the DC field, and a strong polarization results. This polarization eliminates the need of the external DC bias necessary in other condenser microphones.

As shown in FIGS. 4 and 4A, the construction provides for an inner cylinder 84 terminated by an end cap 86. The operative side of the microphone is covered with a Mylar-copper polycarbonate material 90, aluminized side out. More specifically, the cylindrical microphones discussed herein permit an angular sweep of 90° and are formed of a 2 and ⅛ inch wide 5 mil Mylar – 5 mil copper laminate, Mylar side being epoxied down to a 2 inch OD aluminum tube, with a 2 inch wide 50 gauge thick aluminized polycarbonate film, laid polycarbonate side against the copper of the laminate, to form the thermoelectret. The limitations on the length and the dimension perpendicular to the length are caused by (assuming equal quality theremoelectret formation) the increase of capacity with dimension. For example, as 12 inch – 14 inch section of cylindrical microphone as decribed above will have a capacitance of 10,000 pf and an output of 2 mv with the spark source 10 inches away. The latter is about the lower limit allowable for a signal to noise ratio of about 2 to 1. Microphones that are to be longer than 14 inches, say 36 inches, can be sectioned into three sections of 12 inches each, to improve the signal to noise ratio per unit length.

FIG. 5 shows three two section cylindrical microphones in an X, Y, Z type three dimensional array. Any point in space is at the intersection point of the loci of the elements of three mutually perpendicular cylinders of radii $R_1$, $R_2$, and $R_3$ given by the accumulated count off each microphone. Values of $R_1$, $R_2$, $R_3$, which are a unique set identifying the position of the point in space may be inputs to a simultaneous set of equations to give the X, Y, Z coordinates of the point in space.

This point in space may be considered also as the intersection corner of three plane squares or rectangles in space, forming the planar sides of a rectangular parallelopiped where $R_1$, $R_2$, $R_3$, are the diagonals of the planar sides of the parallelopiped. Once again the set of values of $R_1$, $R_2$, $R_3$, uniquely determines the position of the corner referred to above and with the use of proper simulataneous equations will give the space coordinate set X, Y, Z.

Figure 6:
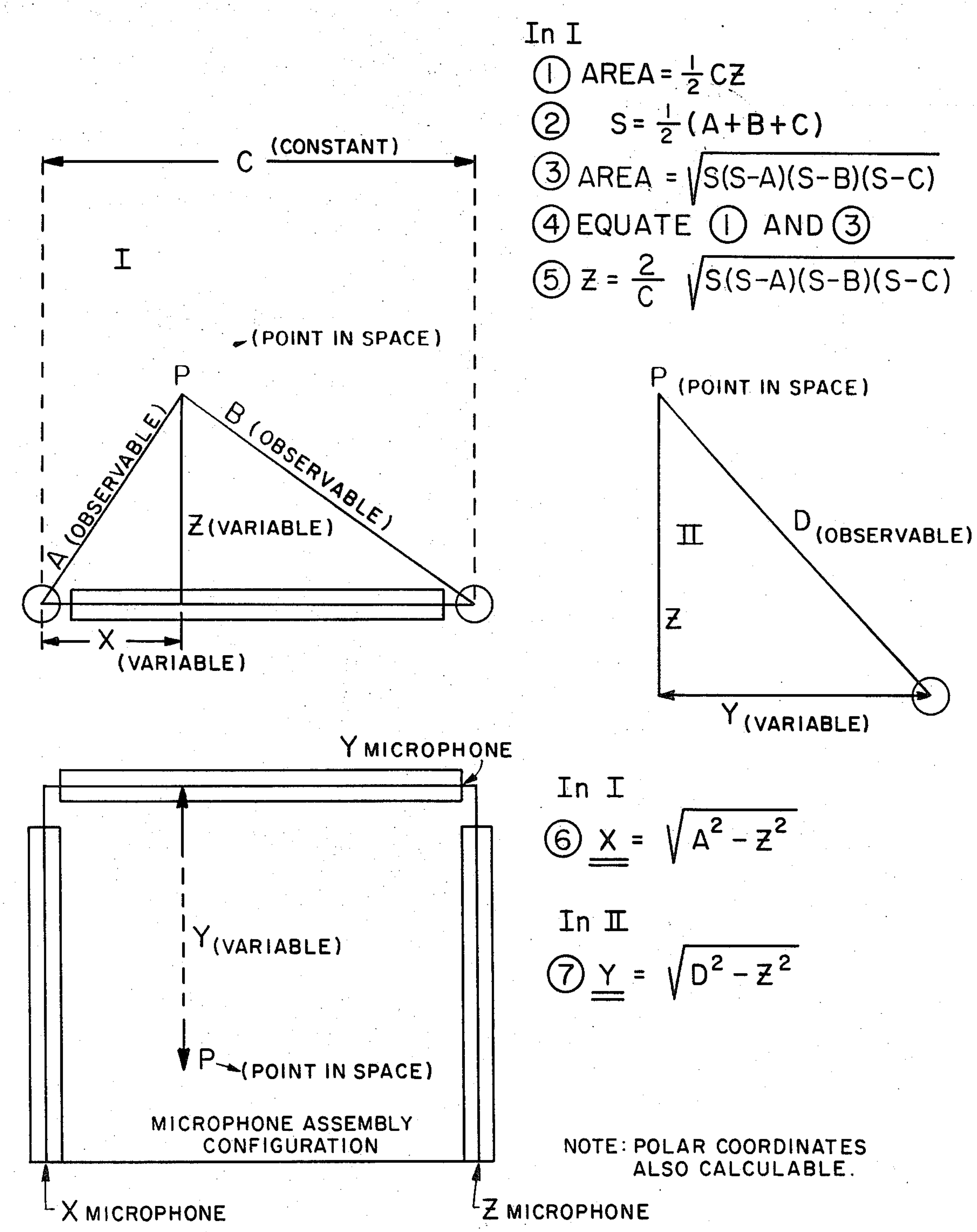
FIG. 6 shows a mathematical analysis of the three dimensional aspect.

In many physical situations the third axis microphone (the vertical one) is limited to a certain maximum height or there can be no height at all to the tablet. FIG. 6 shows a three dimensional tablet where all the cylindrical microphones are in one plane arranged in a U-configuration.

The derivation of the space coordinates X, Y, Z from the observable data A, B and D (which are the radius vectors to the microphones) is shown on FIG. 6.

Figure 7A:
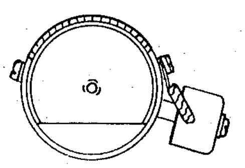
FIGS. 7 and 7A shows a detail of the sectional microphone.
Figure 7:
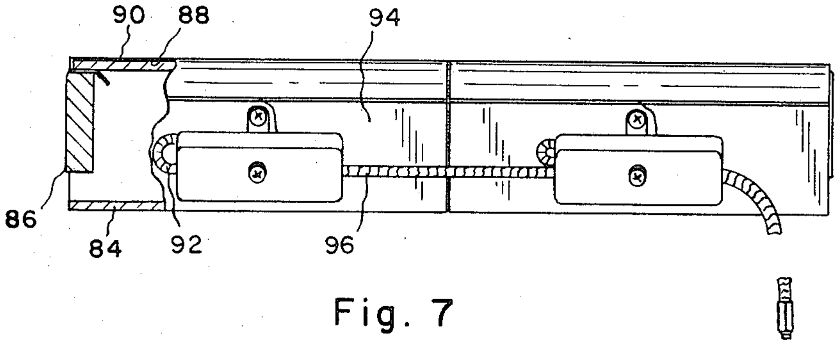

The sectioned microphone is shown in greater detail in FIG. 7. Each section includes an amplifier unit connected with an input 92 coupled to the outer surface 94 and a series cable 96 interconnecting the microphones to the input of the system.

The multiple sectioning is arranged such that each amplifier is coupled to a separate microphone sensing area upon a common substrate, and electrically connected to provide a common output. The foil electret defining the sensitive area is, as shown, split between each section so as to form a plurality of acoustically and mechanically isolated microphones. The isolation improves the signal to noise ratio and permits the use of longer microphones and larger sense areas. Total microphone capacitance in this case is equal to each section capacitance.

Figure 8:
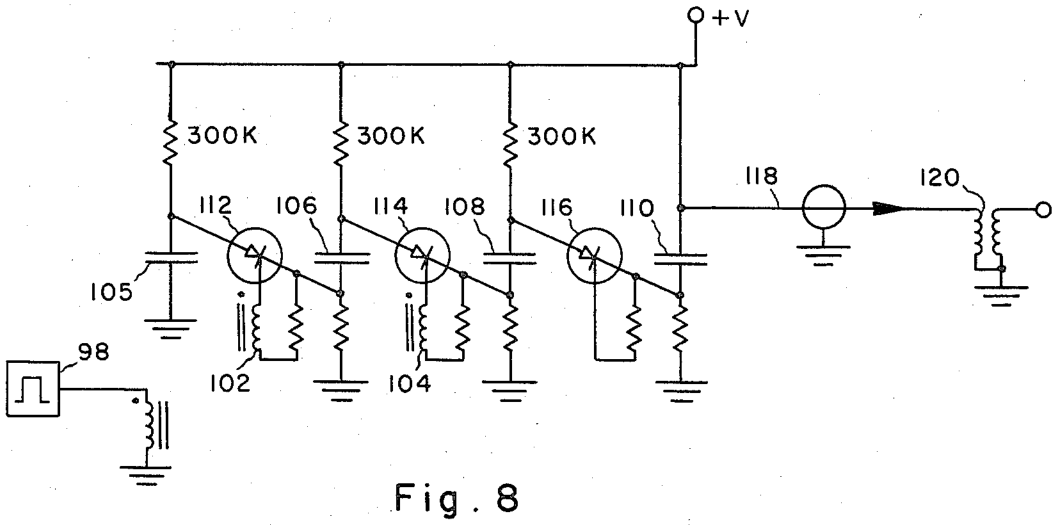
FIG. 8 illustrates one form of trigger circuitry which is employed in the present invention.

Referring to FIG. 8, a preferred form of the trigger circuitry is illustrated for providing a voltage magnitude sufficient for a spark generation.

A source of pulses 98 supplies a transformer primary which couples pulses through to secondaries 102 and 104. The network itself consists of a series of capacitors 105, 106, 108, 110, each series connected between pairs of resistors, excepting capacitor 105, which is connected between a resistor and ground. A source of voltage +v, for example 500 volts, is coupled to each line. Each line is connected to an adjacent line by a thyristor 112, 114, 116. The last capacitor 110 is coupled through a cable 118 to a saturable transformer 120, and from there to the stylus electrodes.

In operation, each of the thyristors are non-conducting and each capacitor is charged up to +V. The appearance of a pulse from the source 98 will, through transformer action, switch the thyristor 112 by applying a positive potential to the gate electrode, thereby rendering the thyristor conductive. The flow through thyristor 112 clamps the lower plate of capacitor 106 at +V, thereby driving the upper plate to V + V or 2V. The thyristor 114, also rendered conductive, clamps the lower plate of capacitor 108 at +2V, thereby driving the upper plate 2V + V or 3V. A transformer secondary could also be employed at the last thyristor 116, however by proper designing of potentials, the last thyristor can self saturate due to the forward impression thereon of a 3V potential difference. With a 500 volt source, and utilizing thyristors type 2N4443, that situation will occur.

The final voltage across capacitor 110 is conducted along the cable 118 and through a step up transformer 120. The transformer 120 is preferably of the saturable core type and guards against excessive overloading at the spark generating electrode, thereby providing a degree of safety factor.

Since certain changes and modifications can be readily entered into in the practice of the present invention without departing substantially from its intended spirit or scope, it is to be fully understood that all of the foregoing description and specification be interpreted and construed as being merely illustrative of the invention and in no sense or manner as being limiting or restrictive thereof.

What is claimed is:

1. A system for generating data signals representative of the coordinates of points within a defined space, comprising:

a source of atmospherically transmissable signals, said source being movable about and throughout said defined space;

first, second and third elongated sound receptors oriented in mutually orthogonal relationship along three coordinate axes which define said space, each of said receptors having a cylindrical surface portion comprising a foil electret facing said defined space which senses the wave front of impinging signals transmitted by said source;

first, second and third time measuring means respectively coupled to said first second and third receptors, each of said time measuring means being further coupled to said source and operative to measure the time duration between a transmission by said source and the sensing of a wave front at its associated receptor; and means responsive to the time durations measured by said time measuring means for generating data signals as a function of said time durations.

2. The combination of claim 1 wherein each of said sound receptors includes a plurality of sections, each section having an amplifier coupled thereto.

3. The combination of claim 1 wherein said amplifiers are physically mounted to their respective sections at the exterior of the receptors and outside the defined space.

* * * * *